US010244023B2

(12) United States Patent
Kaplinger et al.

(10) Patent No.: US 10,244,023 B2
(45) Date of Patent: Mar. 26, 2019

(54) ACTIVE OFFLINE STORAGE MANAGEMENT FOR STREAMING MEDIA APPLICATION USED BY MULTIPLE CLIENT DEVICES

(71) Applicant: International Business Machines Corporation, Armonk, NY (US)

(72) Inventors: Todd E. Kaplinger, Raleigh, NC (US); Alexandre Polozoff, Bloomington, IL (US); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 14/481,315

(22) Filed: Sep. 9, 2014

(65) Prior Publication Data
US 2016/0072865 A1 Mar. 10, 2016

(51) Int. Cl.
*H04L 29/06* (2006.01)
*H04L 29/08* (2006.01)

(52) U.S. Cl.
CPC .............. *H04L 65/60* (2013.01); *H04L 67/06* (2013.01); *H04L 67/1097* (2013.01); *H04L 67/18* (2013.01); *H04L 67/325* (2013.01)

(58) Field of Classification Search
CPC ... H04L 65/60; H04L 67/325; H04L 67/1097; H04L 67/06; H04L 67/18
See application file for complete search history.

(56) References Cited

U.S. PATENT DOCUMENTS 5,815,662 A 9/1998 Ong
7,783,777 B1* 8/2010 Pabla ................ G06F 17/30206
709/238

(Continued)

FOREIGN PATENT DOCUMENTS

EP 2145424 A1 1/2010

OTHER PUBLICATIONS

Datastar Consulting Services, Inc., "iSub Music Streamer", https://itunes.apple.com/in/app/isub-music-streamer/id362920532?mt=8, Jan. 17, 2014, pp. 1-3.

(Continued)

*Primary Examiner* — Chris Parry
*Assistant Examiner* — Soe M Hlaing
(74) *Attorney, Agent, or Firm* — Scully, Scott, Murphy & Presser, P.C.; Richard Wilhelm, Esq.

(57) ABSTRACT

A system, method and computer program product for storing streaming media content includes: receiving streaming content, at a first mobile computing device, from a content service provider over a communications network; and determining, by a secondary mobile computing device specific details of a use of the content currently being received and buffered at the first device. The second device obtains, using the determined specific details, the content expected to be consumed by the first device to a local memory storage device at the secondary device, and stores the expected content for subsequent consumption. The system and method provides for an awareness of data usage of an account instance on the secondary device; storing a set of data locally on a secondary device based on usage of a primary device; and enabling the downloading of a set of data to the secondary device via a local connection to the primary device.

20 Claims, 5 Drawing Sheets (56) References Cited

U.S. PATENT DOCUMENTS

| | | | |
|---|---|---|---|
| 2005/0289236 A1* | 12/2005 | Hull | H04W 4/02 |
| | | | 709/231 |
| 2013/0166669 A1 | 6/2013 | Luna et al. | |
| 2013/0347044 A1* | 12/2013 | Lee | H04N 21/2387 |
| | | | 725/88 |
| 2014/0006483 A1* | 1/2014 | Garmark | H04L 67/42 |
| | | | 709/203 |
| 2014/0011538 A1 | 1/2014 | Mulcahy et al. | |
| 2014/0156694 A1* | 6/2014 | Childs | G06F 17/3005 |
| | | | 707/769 |
| 2015/0074709 A1* | 3/2015 | Berger | H04N 21/4147 |
| | | | 725/32 |

OTHER PUBLICATIONS

Apple, "iCloud Photo Sharing"; http://www.apple.com/icloud-photo-sharing.html; last printed Sep. 9, 2014, pp. 1-5.

* cited by examiner

ACTIVE OFFLINE STORAGE MANAGEMENT FOR STREAMING MEDIA APPLICATION USED BY MULTIPLE CLIENT DEVICES

CROSS-REFERENCE TO RELATED APPLICATIONS

The present invention relates to commonly-owned, co-pending U.S. patent application Ser. No. 14/330,697 filed Jul. 14, 2014, the entire contents and disclosure of which is incorporated by reference as if fully set forth herein.

FIELD OF INVENTION

The present invention relates generally to data storage, particularly of streaming media content from wireless networks, to multiple devices.

BACKGROUND

There are many streaming-media services which may be operated on both a traditional computer, in addition to various types of mobile devices. Typically, the state of a user's activity and preferences may be preserved when the same account is loaded in either environment. For example, the user is able to access the same playlists and songs from the traditional computer and the user's mobile device. There is also capability for a second device to resume playback of a datastream where a first device left off. For example, a user may start watching a video on his/her living room TV and stop watching after about 47 minutes. When that user opens the video on his/her iPad, the service knows to start playback at the 47 minute mark, since a reference was stored on the service's central system to indicate the playback progress.

One performance optimization for streaming media services is to buffer content that is known or likely to be played in the near future. For example, in video applications the next N-minutes may be proactively downloaded so they are available in the event that the network experiences an outage or latency. In a music application, the next N-songs may be downloaded so there is not a delay between tracks while the next song is downloaded.

A current technique for mobile devices is described in US 2013/0166669 that establishes a shared cache between multiple mobile devices requiring a push of data from a source device to a remote device.

Other techniques include file synchronization services, e.g., such as provided by Apple Photostream®, that back up and synchronizes image files across a set of devices linked to an account where the account has an associated cloud storage service which can automatically download the files to other linked devices.

SUMMARY

In one aspect, the present disclosure provides a way for a user to buffer or make content available offline on a second device, based on the usage of the streaming-media service on a first device.

There is provided a system, method and computer program product for managing a particular application's local offline data on a mobile device, such that the offline data is modified as a result of the user's application activity on a second device.

The system and method provides for an awareness of data usage of an account instance on a secondary device; storing a set of data locally on a secondary device based on usage of a primary device; and enabling the downloading of a set of data to the secondary device via local connection to a primary device when available on same local network.

In one aspect, there is provided a system, method and computer program product for storing streaming media content. The method comprises: receiving streaming content, at a first mobile computing device, from a content service provider over a communications network, the content being currently consumed on the first device; determining, by a secondary mobile computing device, via the communications network, specific details of a use of the content currently being received and buffered at the first device, and downloading, using the determined specific details, the content expected to be consumed by the first device to a local memory storage device associated with the secondary device, and storing the expected content, wherein the expected content is subsequently consumed by the secondary device in the future.

In a further aspect, the system for storing streaming media content comprises: a first mobile computing device receiving streaming content from a content service provider over a communications network, the content being currently consumed on the first device; a secondary mobile computing device configured to determine, via the communications network, specific details of a use of the streaming content currently being received and buffered at the first device, and a local storage device at the secondary mobile computing device for storing content, the second device configured to download, using the determined specific details, the content expected to be consumed by the first device, and store the expected content at the local storage device, wherein the expected content is subsequently consumed by the secondary device in the future.

A computer program product is provided for performing operations. The computer program product includes a storage medium, the medium not a propagating signal, the medium readable by a processing circuit and storing instructions run by the processing circuit for running a method. The method is the same as listed above.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

There is provided a system, method and computer program product for improving performance of the service on a mobile device thereby improving a user experience, while enabling a reduction of mobile device's usage of a higher cost network (thereby reducing a user's cost).

The system, method and computer program product provides an awareness of data usage of an account instance on a secondary device; storing a set of data locally on a secondary device based on usage of a primary device; and enabling the downloading of a set of data to the secondary device via local connection to a primary device when available on the same local network. For example, the system and method configures a mobile device to become aware of what data is being consumed by the primary device and determine which data should be stored or cached at the mobile.

Figure 1:
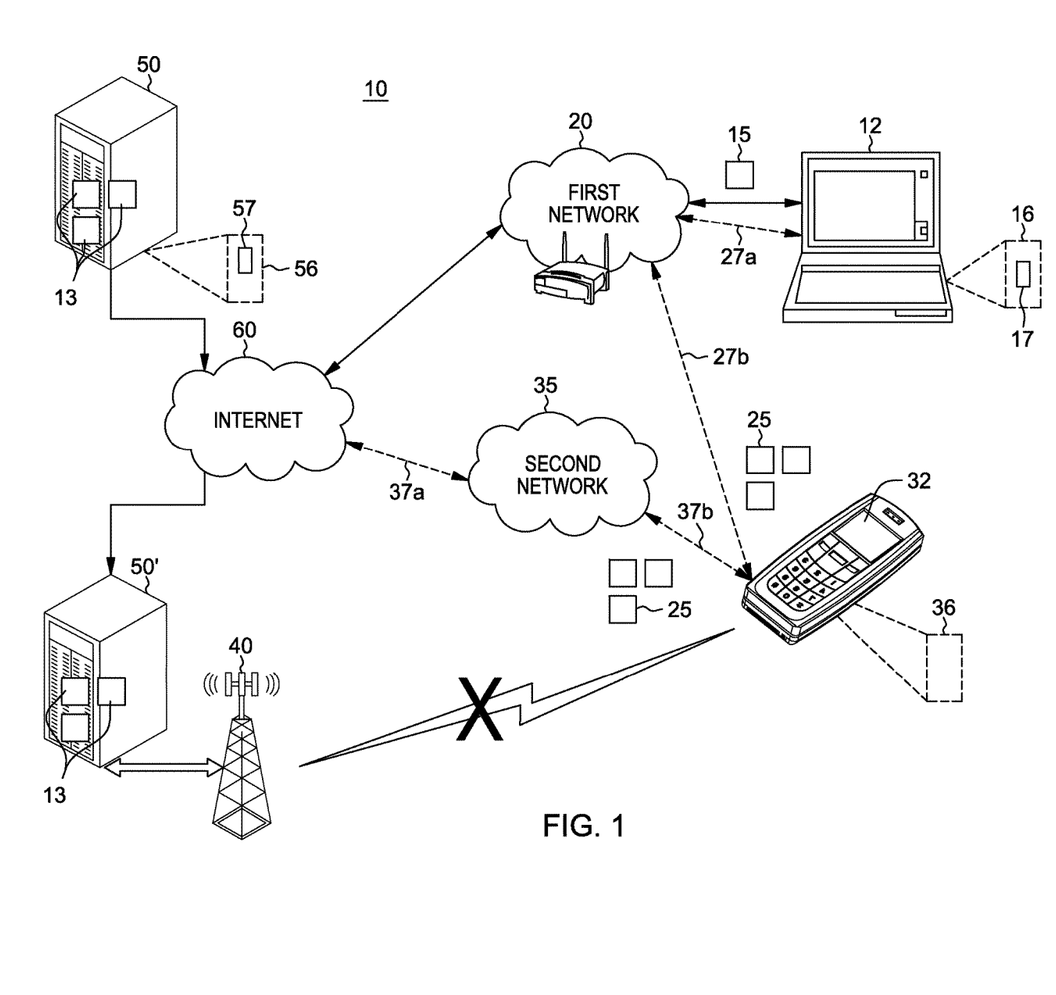
FIG. 1 depicts a system diagram of the off-line content storage management system for streaming media according to one embodiment.

FIG. 1 shows an example system 10 according to one example embodiment. In the embodiment depicted, a first device 12, such as a user's laptop computing system is receiving streaming media content 15, for example from a web-based content (e.g., data or media) service provider or ISP server 50 via the Internet 60 and a first network 20. The device 12 implements existing logic via a background process 16 to buffer received content or data to its local storage device for playback. In one example, this first network 20 may located at a home or a business, e.g., wireless WiFi or a wired LAN network, receiving the streaming media or data content 13 through the Internet. A background process 56 operated by a streaming service controller running at the content provider server 50 functions to manage storage of metadata including a tracked state of the streaming media or data content 13 downloaded by the first device. The user is also in possession of a second device 32, such as the user's mobile phone, e.g., a Smartphone. This same user may also subscribe to the same service content provider on their 2$^{nd}$ device, e.g., smart phone. As the user streams music via their first device 12, e.g. laptop, the user's second device, e.g., smart phone, in an on-state, automatically monitors the content and will begin to download the streaming content 25. That is, a background process 36 at the second device is configured to automatically obtain metadata (e.g., by pulling data or receiving pushed data) about the current data being streamed to the first device 12 and/or upcoming media (e.g., video or songs content) to be streamed from the web-based content service provider embodied by the content server 50 via one of the first or second networks. This further content 25, as an example, may be preemptively downloaded to the second device 32 for local storage such as in a memory storage device or cache at that user's second device 32 via the same network 20 or a second network 35, e.g., a second Wi-Fi network. Thus, when the user leaves the home or office such as during the morning or evening commute, the upcoming content 25 to be listened to is already available and stored locally at the second (e.g., Smartphone) device 32. In this embodiment, the user of the cell phone 32 does not have to connect to a third network, e.g., a cellular phone or satellite-based network, such as embodied as a cellular phone base station 40 providing the same media content with the same or different server 50'. Moreover, the user avoids having to download or continue receiving the same streaming content 25 during the commute where the network usage may be assessed at higher rates than the home or business LAN or WiFi networks 20, 35. The system 10 of FIG. 1, thus yields both cost and performance benefits to the user by avoiding having to continue streaming this content by a more costly other (e.g., cellular or satellite) network as indicated by the "X" in the system depicted in FIG. 1.

In one embodiment, the amount and types of data that may be stored off-line locally at a second device may governed by a variety of criteria, such as by a ranking of content, a social media context, past usage history or an electronic calendar such as described in herein incorporated commonly-owned, co-pending U.S. patent application Ser. No. 14/330,697. In this regard, the system of FIG. 1 provides for the ability to monitor file transfer usage by a user on the primary device and apply analytic analysis to the file transfer usage to identify patterns of usage for the user. Thus, in response to identifying an expected usage on the mobile device the file transfer and storage space usage for the secondary device is adjusted according to a criteria, such as a cost savings criteria.

Figure 2:
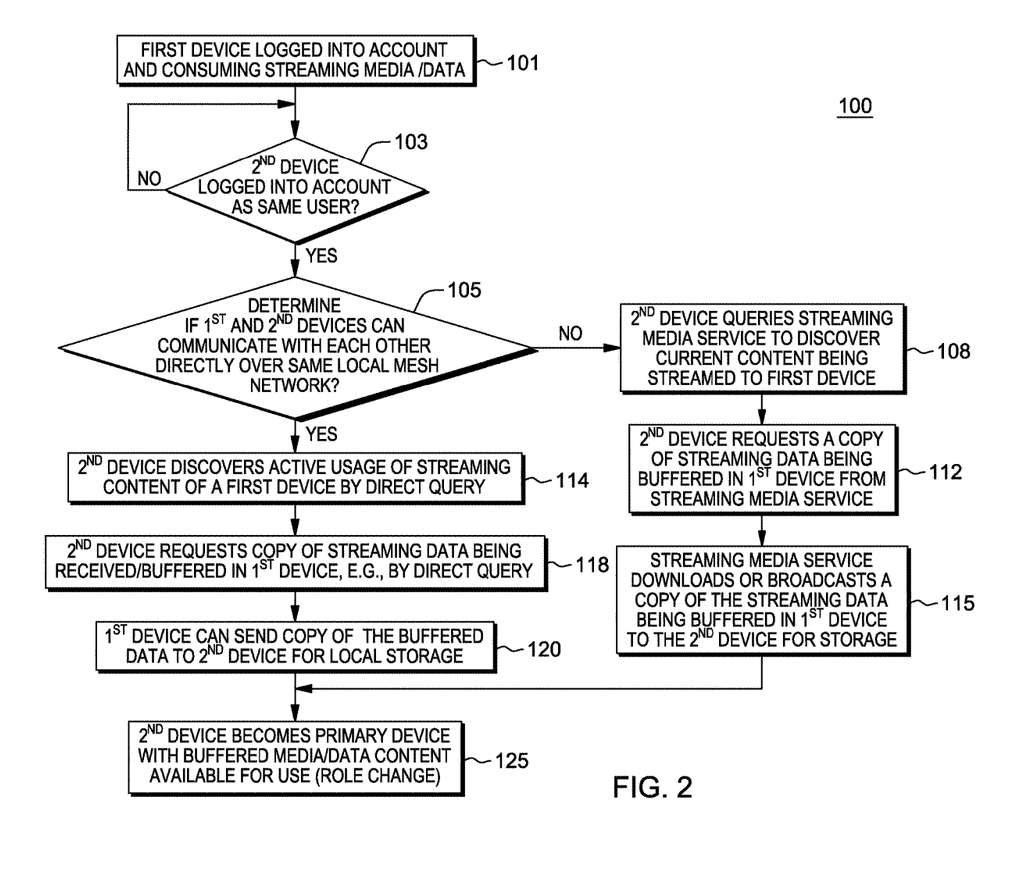
FIG. 2 depicts an overall method to implement a scenario as depicted in the example of FIG. 1.

An overall method to implement a scenario as depicted in the system of FIG. 1, where the second or secondary device 32 automatically preemptively downloads the streaming media (or data) content for off-line storage based on an application's account usage on another device, e.g., a first or primary device 12, is shown in FIG. 2. In this method, the second or secondary device 32 processor runs a background process 36 that must be aware that the user's account for a given application or service is active on the first or primary device 12. Next, the second or secondary device via processing functionality 36 must become aware of the specific data/content 15 being consumed on the first or primary device 12 and how it is being used. Once awareness of data usage has been established (such as by obtaining metadata about the currently streamed content), the processing functionality 36 of the device 32 must initiate a download of a set of data locally by first determining which communication channel (e.g., first or second network) to acquire the data.

Figure 3:
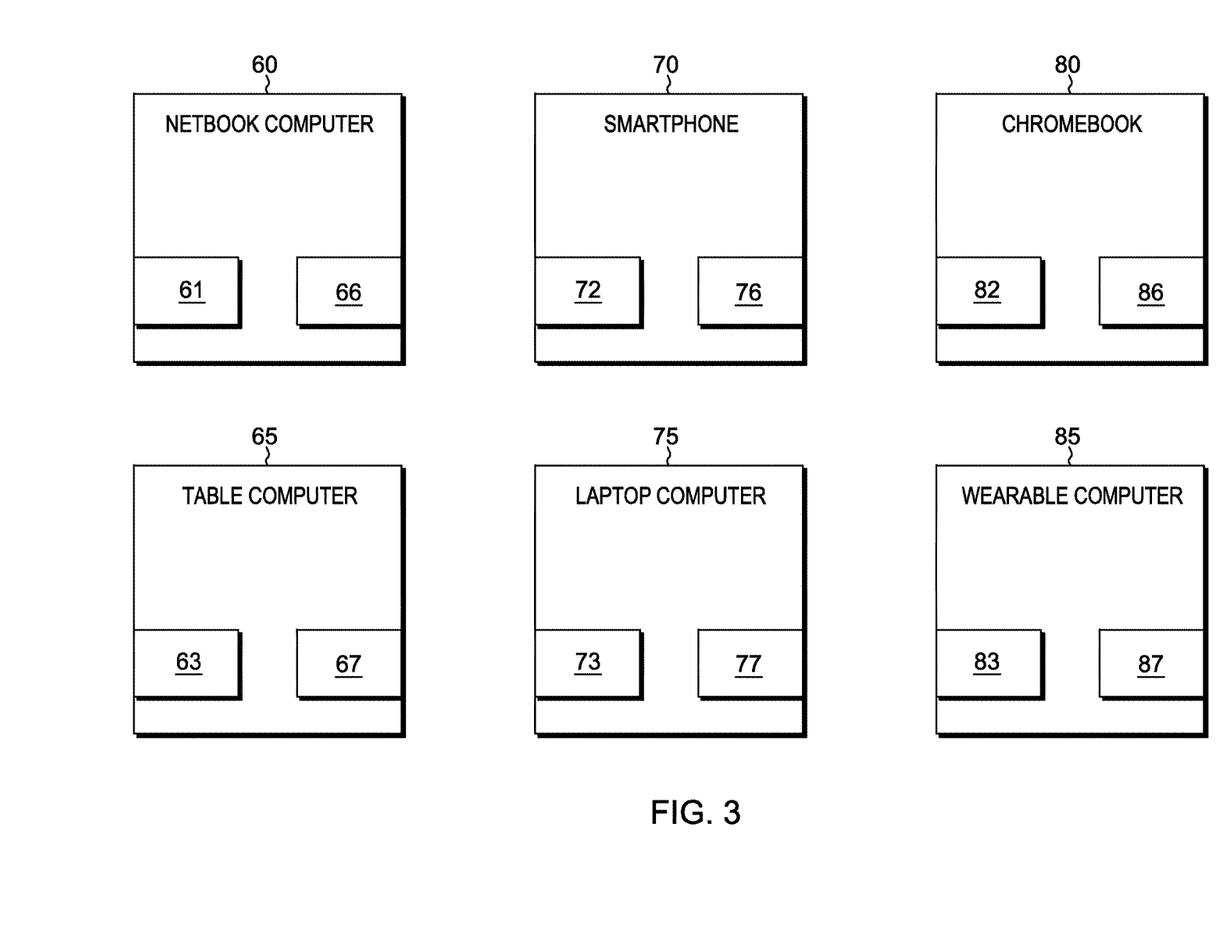
FIG. 3 illustrates examples of the types of devices that can be programmed and configured with applications running the methods described herein.

FIG. 3 illustrates examples of the types of devices that can be programmed and configured with applications running the methods described in connection with FIG. 2. Examples of the device may include, but are not limited to: a tablet computer 65 including at least one processor 63 and at least one memory device 67, a netbook computer 60 including at least one processor 61 and at least one memory device 66, a smartphone 70 including at least one processor 72 and at least one memory device 76, a laptop computer 75 including at least one processor 73 and at least one memory device 77, a specially designed laptop 80 configured primarily for connection to the Internet to run applications and data residing in a "cloud" (e.g., such as a Chromebook®) including at least one processor 82 and at least one memory device 86, or a wearable computer 85, e.g., smartwatch, etc., including at least one processor 83 and at least one memory device 87.

A method 100 governing the processes of the system depicted in FIG. 1 is now described in more detail in connection with FIG. 2. As indicated at first step 101, it is assumed a user of the first or primary device 12 is currently connected to a first network 20 and logged into a streaming media service via the user's account or subscription with the central content provider service embodied by server 50. For example, media data can be streamed via a cloud computing service(s) such as: Amazon® Cloudplayer®, Grooveshark®, Spotify®, Pandora®, and Last.FM®, Netflix®, etc. The first device currently 12 receives streaming media content/data as requested or, pursuant to that user's profile or requested song playlist, queue or video. In this embodiment, it is assumed that the first (primary) device 12 implements existing logic via a background process 16 to buffer received content or data to its local storage device.

At step 103, a determination is made as to whether the user's second or secondary device, e.g., the device to be used in the future such as a Smartphone 32, becomes logged into the same user account with the content service provider as the first device 12, and if, so whether the first and second devices communicate on the same or different networks. If no second device has logged in, the first device continues receiving/consuming streaming media content. If it the case that the second device has logged into the same user account, the process proceeds to step 105 where a determination is made as to whether the first and second devices can communicate with each other directly over a same network 20, e.g., a formed local wireless mesh network, or not. This determination is made by background processes 16, 36 (FIG. 1) running on each of the respective first and second devices and/or determined by the streaming media service. For example, if the first and second devices belong to the same TCP/IP subnet and can successfully ping each other's IP addresses it would be determined they are on the same local network. Additionally, a network speed validation test may be performed to determine if the local network is a preferable approach to transferring data. If the devices have a routable TCP/IP path on the local network with acceptable throughput threshold, then the mesh network is established. This local mesh network 20 may be an ad hoc (mesh) network such as a home communications/data network.

If, at 105, it is determined that the first and second devices can communicate with each other directly over same local mesh network 20, the process proceeds to 114 where the $2^{nd}$ device discovers active usage of streaming content by the first device, and at 118, the $2^{nd}$ device requests a copy of the streaming data being received/buffered in $1^{st}$ device, e.g., by a query directed to the first device over the mesh network 20 as indicated by arrows 27a, 27b. Then at 120, the first device background process 16 is configured to allow the $2^{nd}$ device to download the latest streamed content 25 buffered at the first device for local storage at the second device when the first device has completed its download. In one example, at step 120, the first device 12 may alternatively broadcast the stored streaming content 25 to one or more $2^{nd}$ devices 32, via the mesh network 20, without having to first receive a query from the second device.

Referring back to step 105, FIG. 2, when first and second devices are connected to different networks, e.g., networks 20, 35, it is determined that the first and second devices cannot communicate with each other directly, and the process proceeds to step 108 where the $2^{nd}$ device 32 directly queries the streaming media service content provider service to discover the content being currently streamed to first device 12. Then, at 112, the $2^{nd}$ device requests of the service provider, a copy of the streaming data. Initially, the request may include any state or rolling "metadata" description of the streamed content being buffered in the $1^{St}$ device from streaming media service. Continuing at 115, the streaming media service responsively downloads or broadcasts a copy of the streaming data being streamed to the first device 12 to the $2^{nd}$ device 32 for local storage via the second network 35 as indicated by arrows 37a, 37b.

Thus, as shown in FIG. 2, as the $2^{nd}$ device now maintains streaming content 25 and will know at what point the first device has terminated receiving download. At this point, as indicated at 125, the $2^{nd}$ device can become the new primary device with buffered media/data content available for use whether the content is obtained directly via the first device over a mesh network 20, or whether obtained by the streaming media service itself over second network 35. The secondary device is ready for a role change as is may become the new primary device as it has the buffered media/data content available in its associated local storage. That is, the change from a secondary device to a first device with the provided content is referred to as a "role change". It is understood that, a device becomes primary when an application or service receives user focus on the device.

Figure 4:
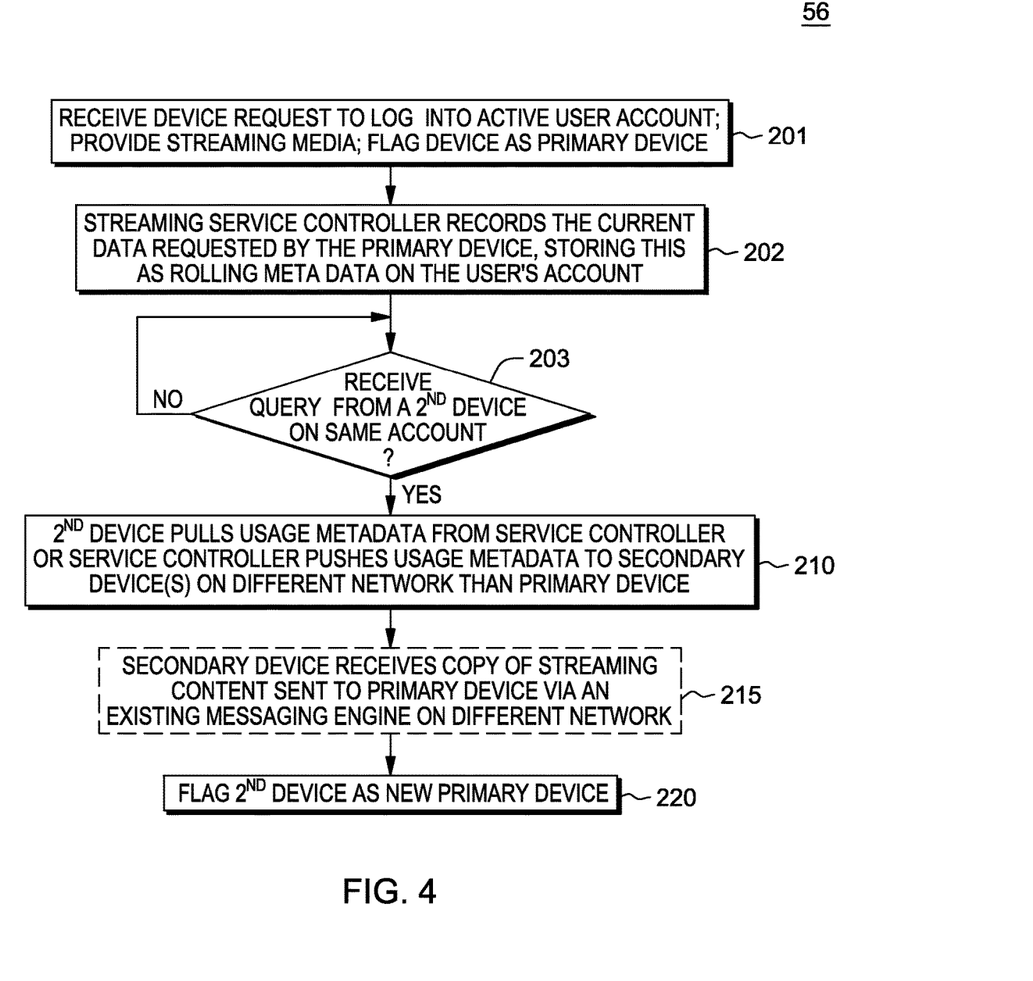
FIG. 4 depicts operations of the background process 56 running at the streaming media content service (content service provider) server 50 for effecting the system 10 of FIG. 1.

FIG. 4 depicts operations of the background process 56 running at the streaming media content service (content service provider) server 50 for effecting the system 10 of FIG. 1 where the first and second devices are connected to the central service via separate networks 20, 35. At 201, the service content provider process 56 receives request of a device to receive streaming media or data content, and that device is flagged (metadata state maintained) as the first or primary device. It is assumed the user's primary device begins consuming (receiving, storing and/or playing) the media or data content. The streaming media content service's controller background process 56 records the state of the current media or data being received and consumed for playback by the primary device, storing this state as rolling metadata 57 (FIG. 1) associated with the user's account. This stored rolling metadata may include, but is not limited to: media-type attributes such as, e.g., encoding parameters (encoding algorithm, and in the case of audio files: an audio bit rate, sample rate, and in the case of video files: a video frame size, video frame rate); and other metadata including: descriptive information of the media content (e.g., artist, title), packet headers, indices, and any digital rights management properties (e.g., information on usage restrictions). Then, subsequently, at 203, a determination is made as to whether a secondary device requests a role change, such as, by logging into the same account as a same user. If not, the process is idle and the process waits until such request is received at step 203. Upon detection by the process 56 of a secondary device being logged into the same account as a same user, then the process commences at 210 where the background process initiates a controller at the streaming media content server 50 to push, i.e., initiate communication of, usage metadata (of content being streamed to the primary device) to the logged in secondary device(s) via a messaging engine used for the second device via the different network. Alternately the service content provider process 56 enables the logged in secondary device to pull the stored usage metadata 57 from service controller or service controller via the different network than the primary device.

Whether pushed or pulled via a request for downloaded at step 210, based on the received usage metadata, at 215, the second device(s) may then begin downloading from the content providing service copies of the streamed data or media content being downloaded to the primary device for local storage thereat for subsequent use. Then, at 220, the background process 56 running at the streaming media content service flags the $2^{nd}$ device as the new primary device.

Figure 5:
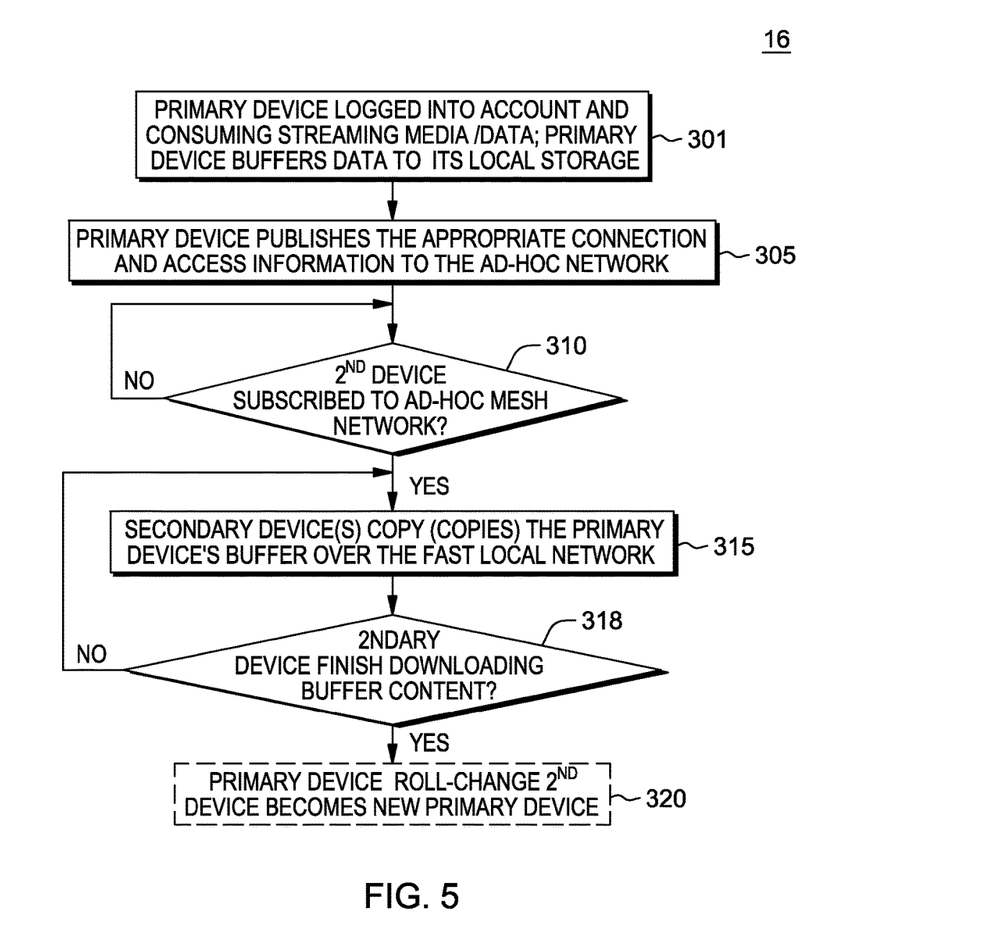
FIG. 5 depicts a flow chart of a method of a background process 16 performed by a primary device when first and second devices are connected to the same network, e.g., ad-hoc mesh network

FIG. 5 depicts a flow chart of a method of a background process 16 performed by a primary device when first and second devices are connected to the same network, e.g., ad-hoc mesh network 20 of FIG. 1. When the primary device 12 and secondary device(s) 32 are on same network (e.g., a wireless network (e.g., Bluetooth), wired network, or a network of any transport medium), no central service process needs to be used. As indicated at first step 301, the primary device is presently logged into the user's account and currently consuming (receiving, storing and/or playing) the streaming media or data content. As part of this activity, the primary device buffers streaming data to its local storage device. Then, at 305, the primary device publishes its appropriate connection and access information, e.g., metatdata 17 (shown in FIG. 1), to the ad-hoc network such that a secondary device may discover the primary device activity of downloading the streaming media or data content. In one embodiment, the primary device 12 may establish a virtual bulletin board (not shown) that can be freely shared with the secondary device(s) and in which, using protocols built on Wi-Fi, the primary device may post messages. Thus, the primary device may post an access message on the bulletin board of the ad-hoc or mesh network 20 providing information enabling a secondary device(s) to directly download the data (e.g., locally) for local storage on the secondary device or multiple secondary devices.

Then, at step 310, a determination is made as to whether a $2^{nd}$ device becomes subscribed to the ad-hoc mesh network 20, such as to initiate a "role change". If no second device becomes subscribed to the ad-hoc mesh network, the primary device continues receiving/consuming streaming media content. Otherwise, the process continues to step 315 where the secondary device(s) begins directly copying the contents of the primary device's buffer over the faster local (ad-hoc) network. In one embodiment, at this step, the primary device exposes its cache or buffer by opening a TCP (transmission control protocol) channel for direct downloading contents of its buffer by the secondary device. In an example embodiment of multiple secondary devices, e.g., a single primary device and four secondary devices, an HTTP (hypertext transfer protocol) port is opened for each, and the four secondary devices may download from that TCP port. Alternately, an SCP (secure copy protocol) port or FTP (file transfer protocol) port may be opened, or any other existing network transfer protocols. For example, in the case of a video program, the primary device may receive and buffer 300 Mbytes of content to be consumed; as soon as this first device gets the data, the $2^{nd}$ device will be able to obtain it locally from the first device, i.e., the authorized second device synchronizes its own rolling buffer. Thus, in one example, the primary device's cache buffer is exposed to the authorized second device which obtains the access metatdata 17 describing state of the first device's buffer, and can side load it when notified by the primary device. In this embodiment, it is further assumed that other secondary devices that are connected to the network may download contents by obtaining the access information from the bulletin board and downloading the contents from the primary device buffer or local storage in like manner. For example, as access to "join" the mesh network is controlled by credentials of the streaming-media account, a second user/device who logs into the streaming media account, would also have credentials to join the mesh network. Once on the mesh network, the second device can query the first device for local access control and connection information necessary to download the files. Such information might be the TCP port, protocol, username/pas sword, Key, etc. Techniques used to obtain different types and amounts of streaming content for off-line storage for future usage may be obtained by using techniques described in commonly-owned co-pending U.S. patent application Ser. No. 14/330,697.

Returning to step 318, it is determined whether the secondary device has completed downloading the buffer contents of the first device. If is determined that the secondary device has not completed downloading the buffer contents of the first device, the process proceeds back to step 315 where the further primary device buffer contents are obtained by the secondary device from the ad-hoc network at the access port indicated. For example, at this step, the further buffer contents may be upcoming songs in a music playlist for download to the local storage of the secondary device. Eventually, once contents are completely downloaded, as indicated at 320, the primary device can relinquish its status as a primary device and the process will end. The secondary device may then send a notification of the device of the roll change via the ad-hoc messaging or bulletin board system infrastructure, i.e., indicating that the new secondary subscribed device has become a new primary device. The former second device may then be flagged as current primary device on the user's account at the central service providing the streaming content/data.

In one embodiment, a combination of techniques may be implemented wherein the secondary device(s) can download the data locally, via the ad-hoc messaging network first, and then obtain additional or continuing data via the central service. For example, the $2^{nd}$ device may discover an active usage of streaming content of a first device via the ad-hoc messaging network and then begin to download streaming content for storage and future use from the media content (central service provider) via the same or different network.

An example scenario depicting the capability enabled by the methods described is now provided. A person is at work is listening to a particular music steaming service such as Pandora® or Last.FM® via their laptop attached to the company network. When away from their desk, this employee also subscribes to the same music service on their smart phone. As the user streams music via their laptop, the smart phone also monitors the upcoming songs in the playlist and downloads them (via Wi-Fi) to its local storage much like the laptop would do to buffer upcoming tracks. When the user leaves the office, the songs to be listened to are already available on the smart phone's local storage so it does not have to contact the cellular network to download them. Thus, the system and methods yield both cost and performance benefits to the user.

In one embodiment, the methods shown in FIGS. 2 and 4-5 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIGS. 2 and 4-5 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for storing streaming media content comprising:
receiving and buffering streaming content, at a first mobile computing device, from a content service provider over a communications network, said streaming content comprising content being currently consumed on the first mobile computing device and at least one item of future content expected to be consumed by said first mobile computing device, said content service provider maintaining metadata associated with a state of said content being currently downloaded to and consumed by said first mobile computing device;
detecting, by said content service provider, a secondary mobile computing device logging into a currently activated user account of said first mobile computing device while said first mobile computing device is currently receiving said content via said communications network;
in response to detecting said secondary mobile computing device logging into said currently activated user account of said first mobile computing device while said first mobile computing device is currently receiving said content, providing, by said content service provider, said maintained metadata to said secondary mobile computing device;

in response to receiving said provided metadata from said content service provider, determining, by said secondary mobile computing device, based on said provided metadata, specific details of a use of said streaming content currently being received and buffered at the first mobile computing device;

downloading, using said specific details, said at least one item of future content expected to be consumed by said first mobile computing device to a local memory storage device associated with said secondary mobile computing device;

storing said at least one item of future content in said local memory storage device associated with said secondary mobile computing device for future use; and consuming said stored at least one item of future content by said secondary mobile computing device at a time in which said communications network is not available for communication by said secondary mobile computing device.

2. The method as claimed in claim 1, wherein said communications network is a single wireless or wired ad-hoc or mesh communications network to which both said first and secondary mobile computing devices are subscribed to receive said content.

3. The method as claimed in claim 2, wherein said determining specific details comprises:

establishing, by said ad-hoc or mesh network, a virtual bulletin board for receiving and posting an electronic message;

publishing, by said first mobile computing device, an electronic notification to said virtual bulletin board to indicate a connection and access communications channel for receiving said content directly from a buffer of said first mobile computing device; and said secondary mobile computing device viewing said notification and configuring itself for receiving said content directly from said buffer of said first mobile computing device via said connection and access communications channel.

4. The method as claimed in claim 3, wherein said access communications channel is a TCP (transmission control protocol) channel.

5. The method as claimed in claim 4, wherein said access communications channel includes a HTTP (hypertext transfer protocol), FTP (file transfer protocol) or SCP (secure copy protocol) port from which said further content expected to be played on the first mobile computing device is received by the secondary mobile computing device.

6. The method as claimed in claim 3, further comprising:

notifying said content server provider that said first mobile computing device is no longer to receive said content, and notifying said content service provider that said secondary mobile computing device is to receive said further content from said content service provider.

7. The method as claimed in claim 1, wherein said communications network includes separate non-routable networks wherein said first mobile computing device connects to a first communications network for receiving said content and said secondary mobile computing device is connected to a second communications network.

8. The method as claimed in claim 1, wherein said providing said maintained metadata comprises:

pushing, by said content service provider, said maintained metadata to said secondary mobile computing device, wherein said secondary mobile computing device uses said maintained metadata to responsively download said content from said content service provider via said second communications network.

9. The method as claimed in claim 1, wherein said providing said maintained metadata comprises:

pulling, by said secondary mobile computing device, said maintained metadata, wherein said secondary mobile computing device uses said maintained metadata to responsively download said content from said content service provider via said second network.

10. A system for storing streaming media content comprising:

a first mobile computing device receiving and buffering streaming content from a content service provider over a communications network, said streaming content comprising content being currently consumed on the first mobile computing device and at least one item of future content expected to be consumed by said first mobile computing device, said content service provider maintaining metadata associated with a state of said content being currently downloaded to and consumed by said first mobile computing device;

a secondary mobile computing device configured to determine, via said communications network, specific details of a use of said streaming content currently being received and buffered at the first mobile computing device, said specific details being determined based on said metadata in response to receipt of said metadata from said content service provider, said metadata being provided to said secondary mobile computing device by said content service provider in response to a detection, by said content service provider, of said secondary mobile computing device logging into a currently activated user account of said first mobile computing device while said first mobile computing device is currently receiving said content;

a local storage device at said secondary mobile computing device for storing content, said secondary mobile computing device configured to download, using said specific details, said at least one item of future content expected to be consumed by said first mobile computing device, and store said at least one item of future content at said local storage device for future use, wherein said secondary mobile computing device is configured to consume said stored at least one item of future content at a time in which said communications network is not available for communication by said secondary mobile computing device.

11. The system as claimed in claim 10, wherein said communications network is a single wireless or wired ad-hoc or mesh communications network to which both said first and secondary mobile computing devices are subscribed to receive said content.

12. The system as claimed in claim 11, wherein said ad-hoc or mesh communications network includes a virtual bulletin board for receiving and posting an electronic message, said first mobile computing device includes configured to:

publish an electronic notification to said virtual bulletin board to indicate a connection and access communications channel for receiving said content directly from a storage device at said first mobile computing device; and said secondary mobile computing device configured to view said notification and configure itself for receiving said content directly from a buffer of said first mobile computing device via said connection and access communications channel.

13. The system as claimed in claim 12, wherein said access communications channel is a TCP (transmission control protocol) channel, said access communications channel including one of: a HTTP (hypertext transfer protocol), FTP (file transfer protocol) or SCP (secure copy protocol) port from which said content expected to be played on the first mobile computing device is received by the secondary mobile computing device.

14. The system as claimed in claim 10, wherein said communications network includes separate non-routable networks wherein said first mobile computing device connects to a first communications network for receiving said content and said secondary mobile computing device is connected to a second communications network.

15. The system as claimed in claim 10, wherein to provide said maintained metadata, said content service provider is configured to:
   push said maintained metadata to said secondary mobile computing device; or
   enable said secondary mobile computing device to pull said maintained metadata,
   wherein said secondary mobile computing device uses said maintained metadata to responsively download said content from said content provider via said second communications network.

16. A computer program product for storing streaming media content, the computer program product comprising a computer readable storage medium, the computer readable storage medium excluding a propagating signal, the computer readable storage medium readable by a processing circuit and storing instructions run by the processing circuit for performing a method, said method comprising:
   receiving and buffering streaming content, at a first mobile computing device, from a content service provider over an ad-hoc or mesh network communications network, said streaming content comprising content being currently consumed on the first mobile computing device and at least one item of future content expected to be consumed by said first mobile computing device, said content service provider maintaining metadata associated with a state of said content being currently downloaded to and consumed by said first mobile computing device;
   detecting, by said content service provider, a secondary mobile computing device logging into a currently activated user account of said first mobile computing device while said first mobile computing device is currently receiving said content via said communications network;
   in response to detecting said secondary mobile computing device logging into said currently activated user account of said first mobile computing device while said first mobile computing device is currently receiving said content, providing, by said content service provider, said maintained metadata to said secondary mobile computing device;
   in response to receiving said provided metadata from said content service provider, determining, by said secondary mobile computing device, based on said provided metadata, specific details of a use of said streaming content currently being received and buffered at the first mobile computing device;
   downloading, using said specific details, said at least one item of future content expected to be consumed by said first mobile computing device to a local memory storage device associated with said secondary mobile computing device;
   storing said at least one item of future content in said local memory storage device associated with said secondary mobile computing device for future use; and
   consuming said stored at least one item of future content by said secondary mobile computing device at a time in which said communications network is not available for communication by said secondary mobile computing device.

17. The computer program product as claimed in claim 16, wherein said determining specific details comprises:
   establishing, by said ad-hoc or mesh network, a virtual bulletin board for receiving and posting an electronic message;
   publishing, by said first mobile computing device, an electronic notification to said virtual bulletin board to indicate a connection and access communications channel for receiving said content directly from a buffer of said first mobile computing device; and
   said secondary mobile computing device viewing said notification and configuring itself for receiving said content directly from said buffer of said first mobile computing device via said connection and access communications channel.

18. The computer program product as claimed in claim 17, wherein said access communications channel is a TCP (transmission control protocol) channel, said access communications channel including one of: a HTTP (hypertext transfer protocol), FTP (file transfer protocol) or SCP (secure copy protocol) port from which said content expected to be played on the first mobile computing device is received by the secondary mobile computing device.

19. The computer program product as claimed in claim 17, said method further comprising:
   notifying said content server provider that said first mobile computing device is no longer to receive said content, and notifying said content service provider that said secondary mobile computing device is to receive said further content from said content service provider.

20. The computer program product as claimed in claim 16, wherein said communications network includes separate non-routable networks wherein said first mobile computing device connects to a first communications network for receiving said content and said secondary mobile computing device is connected to a second communications network.

* * * * *